Sept. 17, 1968 L. C. BLOOM 3,401,951
SWIVELED GOLF CART HANDLE
Filed Sept. 19, 1966

LESLIE C. BLOOM
INVENTOR
BY
BUCKHORN, BLORE, KLARQUIST & SPARKMAN
ATTORNEYS

United States Patent Office 3,401,951
Patented Sept. 17, 1968

3,401,951
SWIVELED GOLF CART HANDLE
Leslie C. Bloom, Portland, Oreg., assignor to Product Engineering Company, Portland, Oreg., a corporation of Oregon
Filed Sept. 19, 1966, Ser. No. 580,293
9 Claims. (Cl. 280—47.17)

ABSTRACT OF THE DISCLOSURE

A handle is swiveled on an arm between horizontal and vertical positions so that the hand of the user can move to its most natural position as the cart is pushed or pulled. The handle is slotted and a pin limits turning movement of the handle and retains the handle on the arm. The handle is split for assembly on the arm and the pin, and a retaining sleeve snaps onto the handle to hold the lower end of the handle together.

---

This invention relates to a golf cart, and more particularly to a swiveled golf cart handle.

Some golf carts of the prior art have had looped or shepherd's crook shaped handles with the transverse grip portion itself extending horizontally. Such a position of the grip portion sometimes causes twist and strain in the pulling arm of a user as he pulls or pushes the golf cart. It would be desirable to provide a golf cart handle which automatically is moved, as a user pulls or pushes the cart, to a position most comfortable to the user's arm.

An object of the invention is to provide a new and improved golf cart.

Another object of the invention is to provide a swiveled golf cart handle.

A further object of the invention is to provide a golf cart having a handle which turns to the most comfortable position as a user pulls or pushes the golf cart.

Another object of the invention is to provide a swiveled golf cart handle structure which can be easily mounted on existing golf carts.

A still further object of the invention is to provide a simple, rugged, durable and inexpensive swiveled golf cart handle.

The invention provides a golf cart having a body, an elongated handle arm on the body and a handle swiveled on the handle arm for movement, in pulling or pushing the cart, to a position of least strain on the arm of the user. A golf cart forming a specific embodiment of the invention includes a looped handle, which is swiveled on a handle arm fixed to the body of the cart, between a first position in which a transverse grip portion of the handle is in a horizontal plane and a second position in which the grip portion is in a vertical plane. Preferably the handle is longitudinally split for assembly on the handle arm, and has a socket portion having an arcuate slot therein into which a pin fixed transversely to the handle arm projects with a retaining sleeve snapped over the socket portion to cover the slot and hold the halves of the socket portion together.

A complete understanding of the invention may be obtained from the following detailed description of a golf cart forming a specific embodiment thereof, when read in conjunction with the appended drawings, in which.

Figure 1:
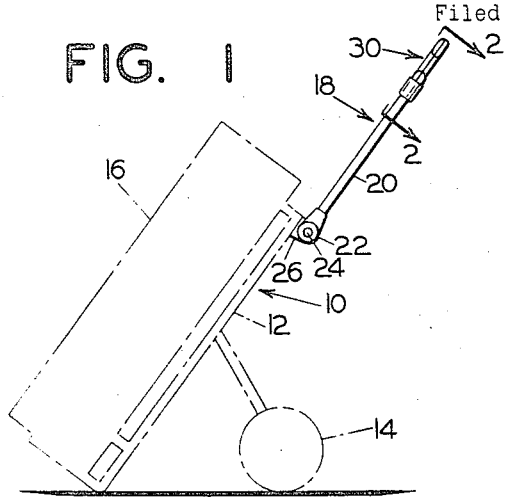
FIG. 1 is a side elevation view of a golf cart forming one embodiment of the invention.

Referring now in detail to the drawings, there is shown therein a golf cart 10 forming one embodiment of the invention and having a body or frame in the form of a tube 12 supported by wheels 14 and adapted to carry a golf bag 16. A handle assembly 18 includes an elongated, rigid, handle arm or tube 20 of metal rigidly fixed to a serrated disc 22 and releasably clamped by a bolt 24 to a block member 26. The handle arm is adjustable, relative to the tube 12, in a vertical plane relative to the block member 26 after loosening a nut (not shown) on the bolt 24, the nut being retightened after adjusting the handle arm to the desired position.

Figure 3:
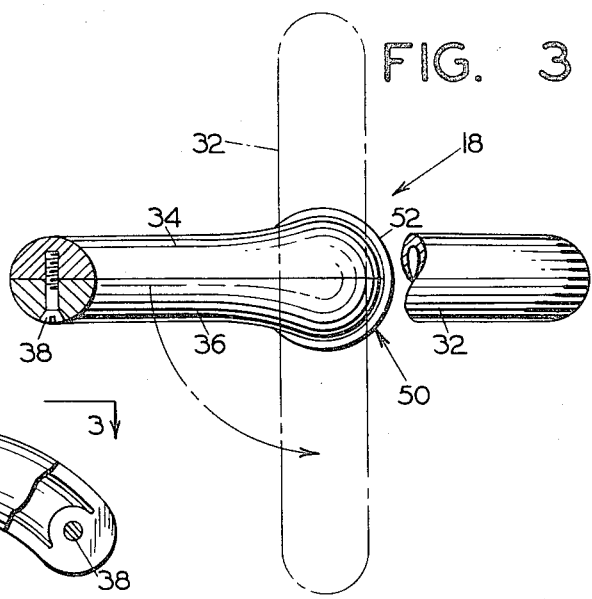
FIG. 3 is an enlarged, fragmentary view taken substantially along line 3—3 of FIG 2.

A looped or shepherd's crook shaped grip or handle 30 is swiveled on the upper or free end portion of the handle 20 for free movement to any desired position from a horizontal position of a curved grip portion 32 shown in full lines in FIG. 3 to a vertical position of the grip portion 32 shown in broken lines in FIG 3. This permits the hand of the user of the cart gripping the grip portion to automatically move to its most natural or strain free position as the user pulls or pushes the cart. The handle 30 includes two molded or cast halves 34 and 36, preferably of a strong, tough plastic material such as, for example, nylon. Screws 38 secure the handle halves together.

The lower end of the handle 30 has a blind bore or socket portion 40 forming a swivel and fitting closely and rotatably on the upper end portion of the tubular handle arm 20. Each half of the socket portion 40 has a circumferential slot 42 directly opposite to the other slot 42 and extending slightly over 90° around the socket portion. A roll pin 44 fits tightly in aligned, transverse bores 46 in the upper end portion of the handle arm 20 and extends into and almost completely through each of the slots 42 to hold the handle 30 against longitudinal movement relative to the handle arm 20 while permitting rotation of the handle through a range of 90° relative to the handle arm to permit the grip portion to move from the horizontal position to the vertical position, or, of course, any position threbetween. At these extreme positions of the handle, the pin 44 engages the ends of the slots 42, which ends act as stops. The range of turning movement of the handle encompasses the most comfortable positions of the handle relative to the handle arm but is short enough to permit the handle to be turned, when desired, to either end of the slots to place a positive torque on the handle arm when needed, as, for example, when the cart is on a slope steep enough to possibly tip over the cart.

Figure 2:
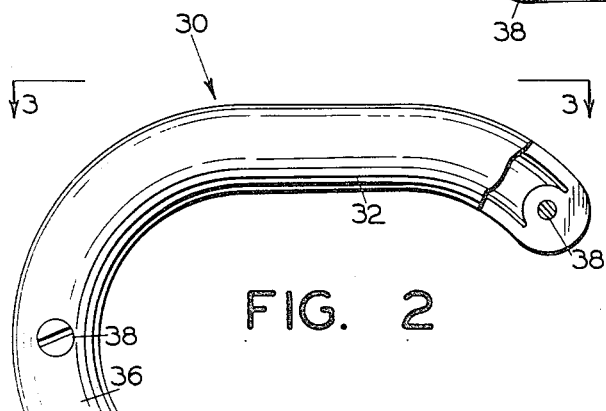
FIG. 2 is an enlarged, fragmentary, sectional view taken substantially along line 2—2 of FIG. 1.
Figure 4:
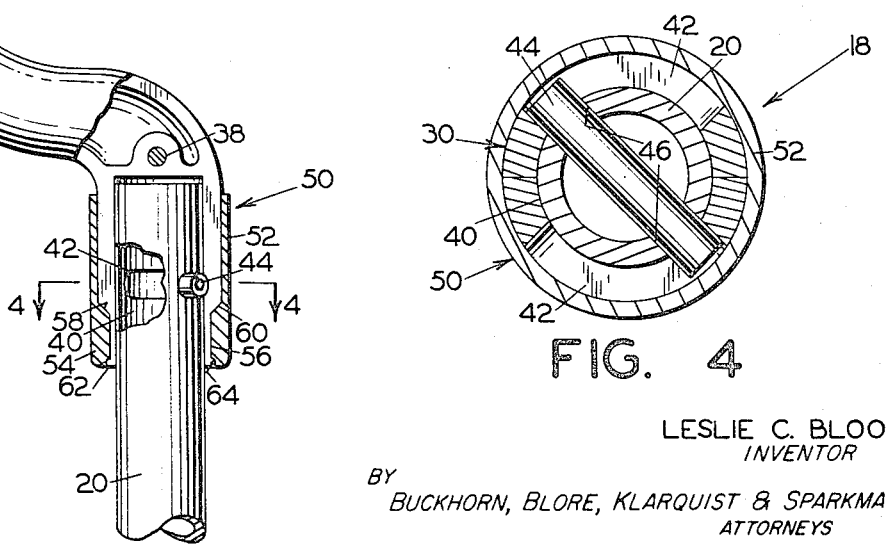
FIG. 4 is an enlarged sectional view taken substantially along line 4—4 of FIG. 2.

A retaining sleeve 50 (FIGS. 2 and 4) preferably of a semi-stiff plastic material such as, for example, nylon, has a thin-walled, cylindrical upper portion 52 fitting closely and slidably onto the socket portion 40 to cover the slots 42 and the roll pin 44. An inner annular ridge or ring 54 of the lower portion of the retaining sleeve fits closely into a complementary, outer, circumferential groove 56 in the lower end portion of the socket portion 40. A tapered end portion 58 of the ridge 54 abuts a tapered portion 60 of the socket member, and a narrow annular flange 62 of the socket member perpendicular to the longitudinal axis of the socket portion fits into a counterbore 64 at the end of the sleeve 50 to retain the sleeve on the handle.

To assemble the handle 30 and the arm 20, the retaining sleeve 50 is slid onto the upper end of the arm 20 to a position somewhat below the pin 44, the ridge 54 of the sleeve being flexed slightly to permit it to move over the ends of the pin. The two halves 34 and 36 of the handle then are placed together and over the roll pin 14 with the outer ends of the roll pin projecting into the slots 42. The retaining sleeve 50 then is slid up onto the handle until the ridge 54 snaps into the groove 56, the flange 62 flexibly compressing and the ridge 54 flexibly expanding slightly as the ridge is forced over the flange, the tapered end portion 58 of the ridge facilitating starting movement of the ridge over the flange by providing a wedging action. The screws 38 then are installed to secure the two halves 34 and 36 of the handle together. The retaining sleeve presses the two halves of the socket portion 40 of the sleeve together with sufficient force that the socket portion 40 grips the arm 20 somewhat so that the handle if not turned with a slight torque by the user will remain in any adjusted position. However, this gripping action is so light that the handle will turn freely, without conscious effort on the part of the user, to the position most natural and strain-free to the user as he pulls or pushes the cart.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a golf cart,
a body portion of a golf cart,
a handle grip member having a transverse member, elongated means connecting the grip member to the body portion for turning movement of the grip member relative to the body portion to permit the grip member to move to a position comfortable to the user during normal travel of the cart,
and means for limiting turning movement of the grip member relative to the body portion to a predetermined angle of movement to provide a positive torque between the handle member and the body portion during abnormal travel of the cart.

2. In a golf cart,
a body,
an elongated handle arm,
means connecting one end of the handle arm to the body and holding the handle arm against rotation about its longitudinal axis,
a grip member,
and swivel means connecting the grip member to the other end of the arm for turning movement of the grip member realtive to the arm to cause the grip member to assume a position most natural to a user grasping the grip member,
the swivel means including stop means limiting turning movement of the grip member relative to the arm.

3. The golf cart of claim 2 wherein the swivel means includes a pin and slot mechanism interconnecting the grip member and the arm to provide free turning of the grip member through a predetermined angle about the longitudinal axis of the arm.

4. The golf cart of claim 2 wherein the swivel means comprises a socket member fixed rigidly to the grip member, an arbor portion fixed rigidly to the arm and connecting means holding the socket member rotatably on the arbor portion.

5. The golf cart of claim 4 wherein the grip member comprises a looped hollow structure including the socket member at one end and a grip portion extending transversely of the longitudinal axis of the socket member.

6. The golf cart of claim 4 wherein the socket member includes a circumferential slot extending partially therearound,
the arbor portion having a trasverse bore therein,
the connecting means includes a pin extending into the bore and the slot to hold the swivel member against longitudinal movement relative to the arbor portion and permit limited rotation of the swivel member on the arbor portion,
and means retaining the pin in the bore and the slot.

7. The golf cart of claim 4 wherein the socket member includes a body portion having a predetermined external diameter and a pair of opposed peripheral slots extending partially therearound and also having an end portion of an external diameter less than said predetermined diameter,
the end portion of the socket member having an external circumferential groove,
the arbor portion having a transverse bore extending therethrough,
the connecting means comprising a pin in the bore and extending into the slots to hold the socket member against longitudinal movement relative to the arm,
and a retaining sleeve on the socket member in a position covering the slots and having a portion extending into the external groove in the end portion of the socket member to hold the sleeve on the socket member.

8. The golf cart of claim 4 wherein the handle arm is a tube having a transverse bore therethrough,
the socket member being provided with a first portion having a pair of circumferential slots in opposite positions and each extending about 90° around the socket member,
the socket member also having an end portion spaced longitudinally from the first portion and having a circumferential groove therein,
a roll pin positioned in the transverse bore and extending into the slots,
and a retaining sleeve having a first portion on the first portion of the socket member in a position covering the slots and also having a second portion provided with an internal ring fitting into the circumferential groove,
the second portion of the sleeve being sufficiently resilient to permit the ring to be sprung over the portion of the socket member adjacent the groove.

9. In a cart handle construction,
a handle having a hand grip portion and a socket portion for receiving an end of an arm rotatably and permitting rotation of the handle on the arm,
means for locking the socket portion on the end of the arm against longitudinal movement on the arm,
and means for limiting rotation of the handle on the arm to a predetermined angle.

References Cited

UNITED STATES PATENTS

| | | | |
|---|---|---|---|
| 1,946,422 | 2/1934 | Carter | 280—87.01 |
| 2,571,699 | 10/1951 | Firth | 287—52.06 |
| 2,741,255 | 4/1956 | Neptune | 287—52.06 |
| 2,793,871 | 5/1957 | Stableford. | |
| 2,918,297 | 12/1959 | Peters. | |
| 2,986,416 | 5/1961 | Firth | 287—52.06 |

BENJAMIN HERSH, *Primary Examiner.*

J. A. PEKAR, *Assistant Examiner.*